(12) United States Patent
Noya

(10) Patent No.: US 6,513,142 B1
(45) Date of Patent: Jan. 28, 2003

(54) SYSTEM AND METHOD FOR DETECTING OF UNCHANGED PARITY DATA

(75) Inventor: Eric S. Noya, Groton, MA (US)

(73) Assignee: Adaptec, Inc., Milpitas, CA (US)

( * ) Notice: Subject to any disclaimer, the term of this patent is extended or adjusted under 35 U.S.C. 154(b) by 378 days.

(21) Appl. No.: 09/604,203

(22) Filed: Jun. 27, 2000

(51) Int. Cl.[7] .................................................. G06F 11/10
(52) U.S. Cl. ........................ 714/803; 714/799; 711/113
(58) Field of Search ................................. 714/803, 799, 714/6; 711/113, 138

(56) References Cited

U.S. PATENT DOCUMENTS 6,108,812 A * 8/2000 Born .......................... 714/807
6,173,361 B1 * 1/2002 Taketa ........................ 711/113
6,219,800 B1 * 4/2002 Johnson et al. ................ 714/5

* cited by examiner

Primary Examiner—Phung M. Chung
(74) Attorney, Agent, or Firm—Cesari and McKenna, LLP

(57) ABSTRACT

A system and method for detecting unchanged parity in a random data block write operation to a disk array, and for acting upon such detection is provided. A direct memory access and exclusive-OR (DMA/XOR) engine transfers data between the host processor, a cache memory and the disk array, which can be configured as a redundant array of independent disks (RAID) having a stripe storage block structure across multiple drives and separate parity blocks. The DMA/XOR engine reads the states of the original stored data block, the new data block to-be-written and the original parity, and performs XOR operations, combining the data to derive the data difference. If the data difference result is zero, indicating no data difference, then the write of new parity and new data to respective blocks is omitted, and/or other optimizing functions are performed.

9 Claims, 6 Drawing Sheets

SYSTEM AND METHOD FOR DETECTING OF UNCHANGED PARITY DATA

FIELD OF INVENTION

The invention relates generally to the field of computer systems and more particularly to systems that employ disk storage based upon a redundant array of independent disks (RAID) implementation.

BACKGROUND OF THE INVENTION

A computer system includes an operating system whose primary function is the management of hardware and software resources in the computer system. The operating system handles input/output (I/O) requests from software processes or applications to exchange data with on-line external storage devices in a storage subsystem. The operating system (such as Windows NT® available from Microsoft, Corp. of Redmond, Wash.) forwards I/O requests to an I/O subsystem, which, in turn, converts the logical addresses into physical locations in the storage devices and commands the latter devices to engage in the requested storage or retrieval operations.

The on-line storage devices on a computer are configured from one or more disks into logical units of storage space referred to herein as "containers." Examples of containers include volume sets, stripe sets, mirror sets, and various Redundant Array of Independent Disk (RAID) implementations. A volume set comprises one or more physical partitions, i.e., collections of blocks of contiguous space on disks, and is composed of space on one or more disks. Data is stored in a volume set by filling all of the volume's partitions in one disk drive before using volume partitions in another disk drive. A stripe set is a series of partitions on multiple disks, one partition per disk, that is combined into a single logical volume. Data stored in a stripe set is evenly distributed among the disk drives in the stripe set. In its basic configuration, a stripe set is also known as a "RAID 0" configuration. A mirror set is composed of volumes on multiple disks, whereby a volume on one disk is a duplicate copy of an equal sized volume on another disk in order to provide data redundancy. A basic configuration for a mirror set is known as "RAID 1." There is often a desire to increase data reliability in a stripe set by using parity distributed across storage blocks with respect to each stripe. Where such parity is provided to the stripe set, the configuration is known as "RAID 5." In an even more complex implementation, where stripe sets are mirrored on a plurality of containers-and redundant data is distributed across the stripes, the resulting configuration is known as "RAID 10." Generally speaking, all configurations of the RAID implementation (RAID 0–10) provide a collection of partitions, where each partition is composed of space from one disk in order to support data redundancy.

According to a prior system, the I/O subsystem configures the containers through a software entity called a "container manager." Essentially the container manager sets up a mapping structure to efficiently map logical addresses received from the operating system to physical addresses on storage devices. The I/O subsystem also includes a software driver for each type of container configuration on the system. These drivers use the mapping structure to derive the physical addresses, which they then pass to the prospective storage devices for storage and retrieval operations.

Speed of data transfer and storage is an important aspect of RAID storage arrangement. Enhancing speed, where possible is highly desirable. Typically, read data from the disk is cached in a large cache memory and transferred into and out of the cache for subsequent delivery to the host processor using a direct memory access (DMA) engine. Likewise write data from the host is first cached in the cache by the DMA engine for eventual delivery to the disk. Parity information for disk-stored data is generally maintained in appropriate blocks in the disk array in accordance with the particular RAID configuration. Parity is read by the DMA and combined using an XOR function with read data to perform an error check. Likewise, new parity is generated by the XOR process and rewritten to the appropriate parity block whenever an associated data block is written-to.

In an exemplary RAID 5 configuration, when data is read from the disk array, either across sequential blocks, or from random blocks, speed is relatively quick since existing stored data and parity are simply accessed, cached and read. Likewise a "sequential" write to a group of contiguous blocks and concurrent rewriting of overall parity is a relatively quick procedure. However, the writing of to a, random single block or blocks within the array can prove very time-consuming. As described in detail below, there are several read and write steps involving old and new parity for the rewritten data block. This multiplicity of steps in performing a random write significantly slows the data transfer process. In addition, this multi-step process occurs even if the new data block and associated parity are unchanged from the corresponding originals. Hence the same parity is written to the parity block as that originally stored, resulting in a redundant read and write process therefor.

Accordingly, it is an object of this invention to provide a more efficient system and method for detecting unchanged parity in a random disk write process, and thereby avoiding redundant parity-handling steps, particularly applicable, but not limited to a RAID 5 stripe set.

SUMMARY OF THE INVENTION

This invention overcomes the disadvantages of the prior art by providing a system and method that enables greater efficiency in the performance of write operations to a disk array, particularly where the disk array is configured as a RAID level 5 implementation having stripes of data and distributed parity blocks and the write is a "random" write to a discrete, non-sequential storage block within the array.

In a preferred embodiment, a direct memory access and exclusive-OR (DMA/XOR) engine is resident on a bus structure between a host processor system and the disk array, which is typically configured as a RAID 5. The DMA engine can comprise a state-machine having various combinatorial logic functions. A cache memory is also resident on the bus and is adapted to cache write data written from the host and read from the disk array under control of a cache manager prior to storage thereof in the disk array.

When a random write operation is instructed to a predetermined location in the disk array, the new block of data is cached and the original block of data is read from the disk and also cached. The original parity block, associated with the original block of data and distributed within the disk array at a predetermined storage location is also read and cached. The cached original and new blocks of data are combined using the XOR function to derive a first result. The first result is then combined by the XOR function with the original distributed parity block to derive a data difference. A detection function determines whether the data difference is zero or non-zero. If zero, the new block is unchanged relative to the original block and no write of the new data block or any associated new parity to the disk array occurs. Conversely, if the data difference is non-zero, indicating a change, then the new block is written over the old block in the disk array and, likewise, the data difference is overwritten as the new parity. In this manner, the additional write steps are avoided when they would prove redundant.

BRIEF DESCRIPTION OF THE DRAWINGS

The foregoing and other objects and advantages of the invention should become clearer with reference to the following detailed description, as illustrated by the drawings, in which.

DETAILED DESCRIPTION OF AN ILLUSTRATIVE EMBODIMENT

Figure 1:
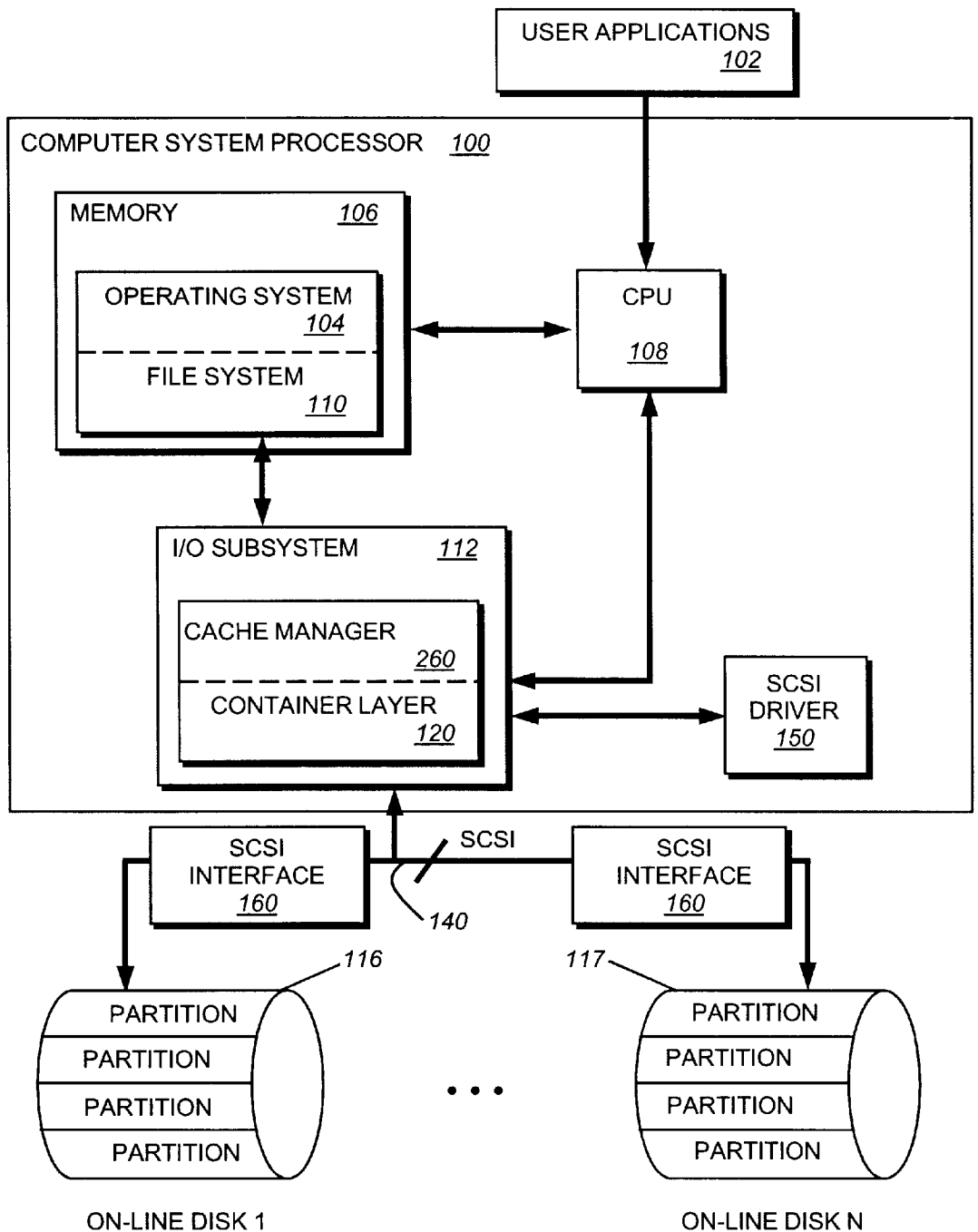
FIG. 1 is a block diagram of a typical RAID storage implementation showing a partitioned set of disks according to the principles of this invention.

FIG. 1 is a schematic block diagram of a typical computer system that is as a RAID 5 storage configuration in accordance with the present invention. The computer system processor 100 comprises a memory 106 and an input/output (I/O) subsystem 112 interconnected with a central processing unit (CPU) 108. The memory 106 comprises storage locations addressable by the CPU 108 and I/O subsystem 112 for storing software programs and data structures. An operating system 104, portions of which are typically resident in the memory 106 and executed by the CPU 108, functionally organizes the computer processor 100 by, inter alia, handling I/O operations invoked by software processes or application programs executing on the computer. The I/O subsystem 112 is, in turn, connected to a set of on-line storage devices 116. These on-line storage devices 116 are partitioned into units of physical space associated with the inventive procedure described herein. The storage devices (disk drives) are typically interconnected via a small computer system interface (SCSI) bus 140 having a driver circuitry shown as generalized block 150. This circuitry may be distributed throughout the system in both hardware and software. Each disk drive is connected to the bus via appropriate SCSI interface circuitry 160 known generally to the art.

User applications 102 and other internal processes in the computer system invoke I/O requests from the operating system 104 by file names. A file system 110, which is a component of the operating system 104, translates the file names into logical addresses. The file system 110 forwards the I/O requests to a I/O subsystem 112 which, in turn, converts the logical addresses into physical locations in the storage devices 116 and commands the latter devices to engage in the requested storage or retrieval operations. The I/O subsystem 112 configures the partitions of the physical storage devices 116, 117 into containers and stores container configuration tables in the container layer 120 of the I/O subsystem 112. Container configuration enables the system administrator to partition a disk drive into one or more virtual disks. In addition, a cache manager 260 and corresponding cache memory operates in association with the I/O subsystem 112 as described further below.

Figure 2:
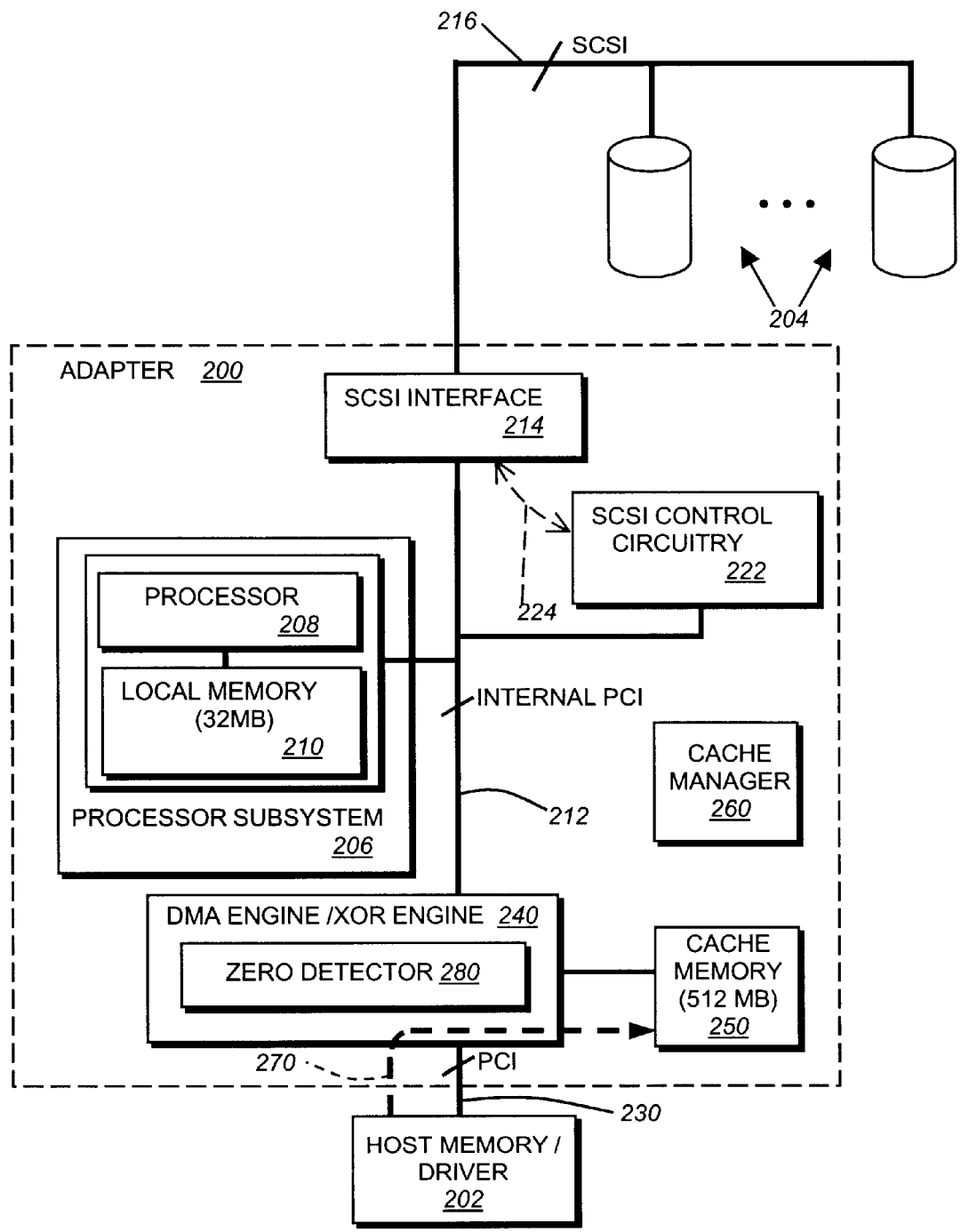
FIG. 2 is a more detailed block diagram showing an adapter for detecting and acting upon unchanged parity according to a preferred embodiment of this invention.

With further reference to FIG. 2, a modified adapter 200 is provided to handle memory storage between the host memory and its associated driver 202 and the RAID disk storage array 204, configured as a RAID 5 set in this embodiment. A processor subsystem 206 is provided including an on-board processor and a local memory 210. The local memory in this embodiment is a 32-megabyte array. However the size and configuration of this memory is highly variable. The processor subsystem is interconnected along an internal peripheral component interconnect (PCI) bus 212. The internal PCI bus 212 is, itself, terminated in a small computer system interface (SCSI) bus interface 214 that supports an SCSI bus 216 extending to the RAID storage array 204. As described above, the disks of the array are arranged in a group of containers according to a desired storage configuration (RAID 5 for example).

The SCSI functions and parameters are controlled by a set of SCSI control circuits/chips 222, generally resident on the PCI bus (a 64-bit PCI in this embodiment) and also in direct connection (dashed line 224) with the SCSI interface 214.

The host memory/driver 202 is interconnected with the adapter via an external PCI bus 230. The connection is specifically made through a direct memory access (DMA) engine 240 according to this invention. As described further below, the DMA engine also includes a logical exclusive-OR (XOR) capability using appropriate combinatorial logic. Hence, it is additionally termed an XOR engine, according to this embodiment. In general DMA/XOR engine 240 is an application specific integrated circuit (ASIC) having an architecture that is adapted to carry out the unique detection function according to this invention.

The DMA/XOR engine is also interconnected to an on-board cache memory 250. The cache memory is adapted to store blocks passing between the host and the disk array, and has a size of 512 megabytes in this embodiment. The size and configuration of this memory is, again, variable depending upon system requirements and application. Typically, it is a non-volatile, battery-backed-up storage device designed to ensure that data is reliably maintained before and during transfer to the disk array. I/O operations are essentially complete from a processor perspective when data is cached, since the manager can, at a remote future time (if necessary), perform the final transfer to the disk array independently. Direct disk access functions are, therefore governed by a cache manager 260 according to this embodiment. In general, when data is written by the host to appropriate addresses in the disk array 204 the cache manager to intervenes and initially places the write data into the cache 250 for subsequent transfer down the SCSI bus 216 via the SCSI interface 214.

Generally, the DMA function enables direct, high-speed caching of data from the host to the cache (dashed line 270) and on to the disk array without direct host processor intervention under the control of the cache manager. When a write to the disk from the host of a data block is instructed, the block is initially transmitted down the bus arrangement, and stored in the cache memory 250. Again, this occurs by action of the DMA engine 240 free of CPU intervention. The DMA then transfers the blocks from the cache to the disk assembly, also free of intervention. The cache manager particularly facilitates addressing and storage of blocks in the cache. Blocks are typically 4 K-8 Kbyte in this embodiment. The DMA can include a variety of related functions. For example, detection of unique blocks of data can be accomplished, and certain optimization functions can be undertaken when specific forms of data are detected. One detection function is described in commonly assigned U.S. patent application Ser. No. 09/604,348, filed on Jun. 27, 2000 entitled System and Method for Detection of Disk Storage Blocks Containing Unique Values by Eric Noya, the teachings of which are expressly incorporated herein by reference.

Figure 3:
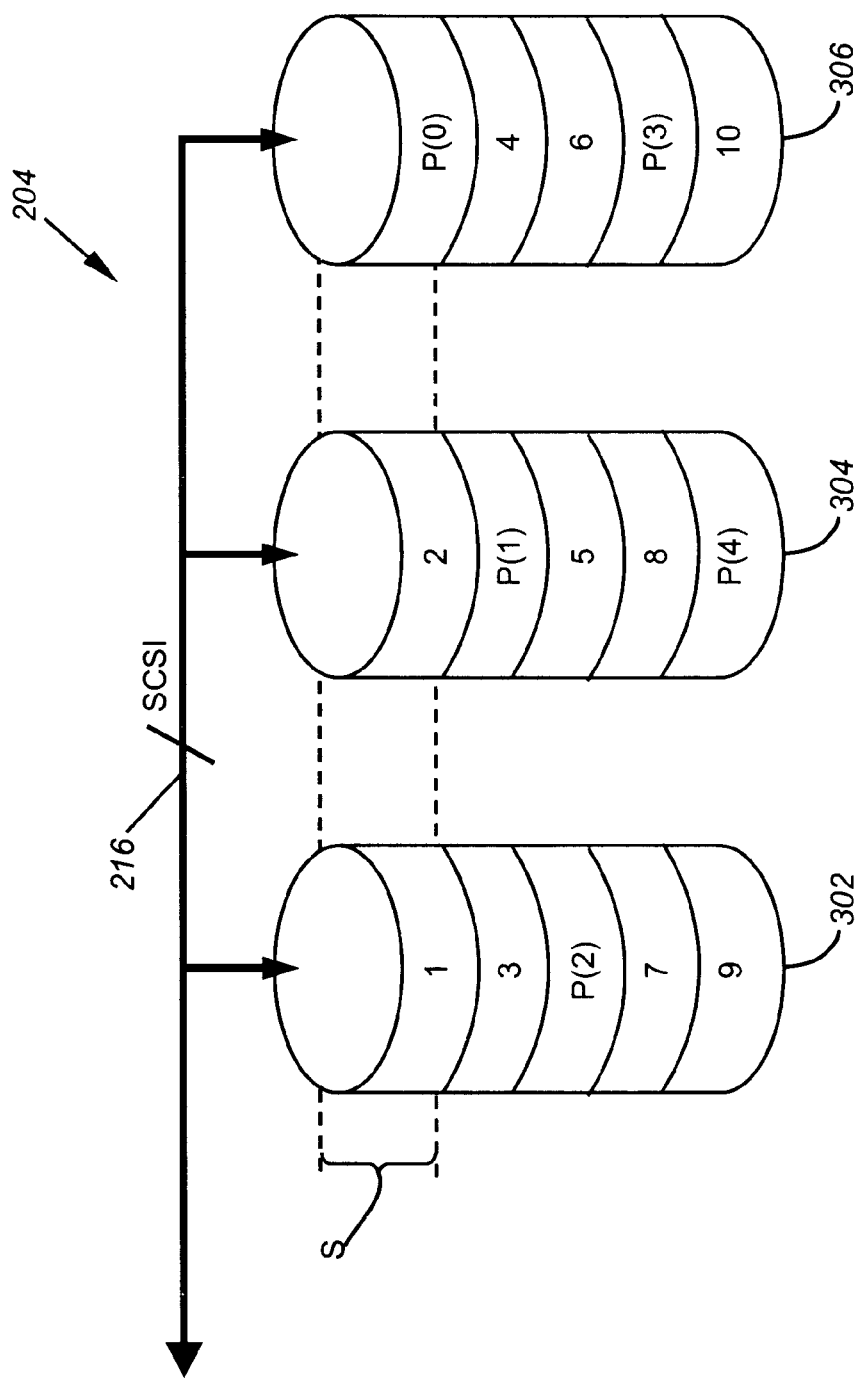
FIG. 3 is a schematic diagram of a disk storage array including stored data blocks and parity blocks for use with the system and method of this invention.

FIG. 3 illustrates the disk array 204 arranged with independent disk drives 302, 304 and 306. The number of disk drives shown is arbitrary and highly variable. The drives are divided so as to contain discrete storage blocks shown as exemplary blocks 110 and corresponding distributed parity blocks P(0), P(1), P(2), P(3) and P(4). A RAID 5 "stripe" S is shown as blocks 1 and 2 and associated parity block P(0).

Figure 4:
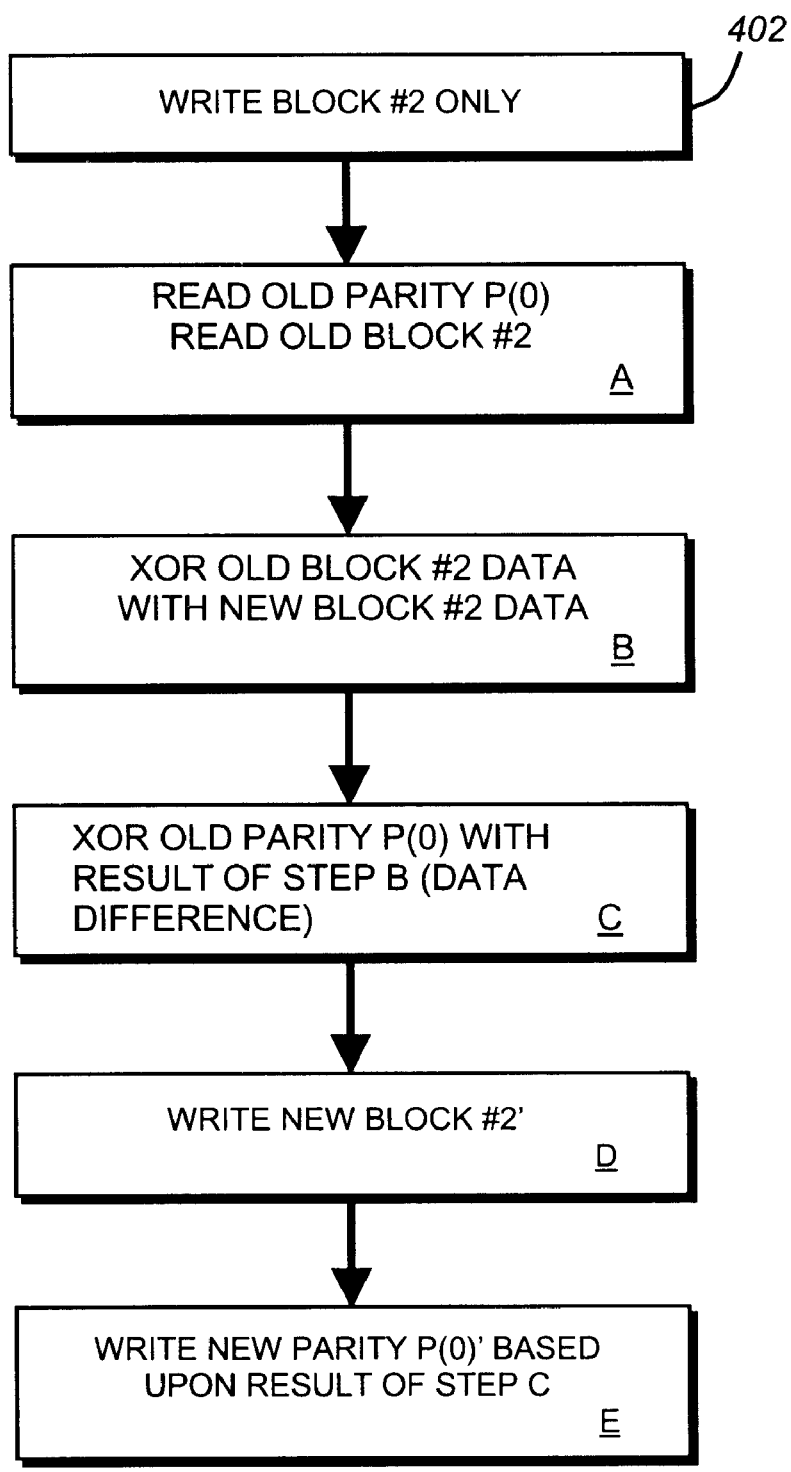
FIG. 4 is a flow diagram of an exemplary random block write process within the disk storage array of FIG. 3.
Figure 5:
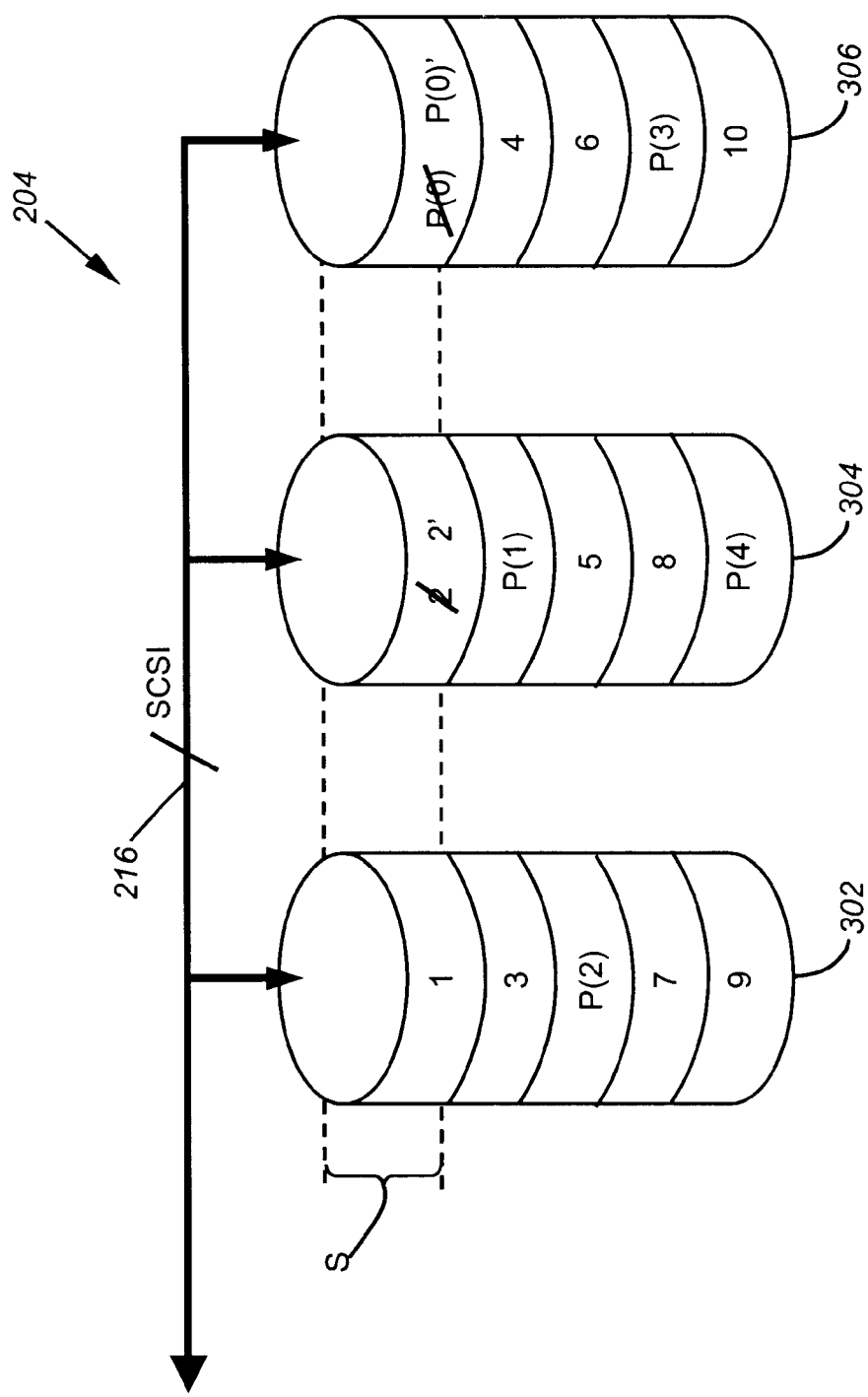
FIG. 5 is a schematic diagram of the disk storage array of FIG. 3 showing changes in selected data and parity blocks according to the process of FIG. 5.

By way of example, a write to only block 2 is desired (e.g. a random write thereto). If so, the steps outlined in FIG. 4 are generally employed according to a conventional storage-handling arrangement to write data and update parity. When an instruction to write certain data to block 2 is received (402), the old parity data P(0) associated with this block is read and cached, and the data of Block 2 is also read and cached (step A). In general, all data moving into and out of the disk drive is passed through the cache memory 250 under control of the cache manager 260. This data is moved via the DMA engine. Therefore, contemporaneous with data movement, the values of data can be tracked and tabulated by the DMA engine. The DMA engine's XOR function then acquires the old block 2 data and combines this value with the new block 2 data (step B). Next the old parity P(0) is XORed by the engine with the XOR result of step B to produce a data difference value, if any (step C). Referring also to FIG. 5, the new data is then written into the disk (via the cache) as updated block 2' (step D). Finally, the new parity P(0)' block is written into the appropriate disk space (step E). Note that the original block 2 and parity P(0) have been symbolically crossed-out in FIG. 5 in favor of new block 2' and new parity P(0), thereby indicating a rewrite of this space.

Clearly, there are several time-consuming steps involved in the full random write process. Therefore, reference is now made to FIG. 6. According to a preferred embodiment, the DMA engine is configured to read the state of the XOR function (step 602), which combines the old block data with the new write data (as detailed step B in FIG. 4). The circuit then determines whether the detected XOR result from step B equals 0 (decision step 604). The detector of the zero result 280 can be included in the overall combinatorial logic of the DMA/XOR engine, or resides at another location within the adapter. If the result of the XOR in step B equals zero, then this indicates no change, and steps C, D and E may be skipped (step 606 in FIG. 6). In other words the "new" data block and associated parity are not rewritten to the disk drive, but rather are discarded from the cache by freeing the cache blocks for overwrite by new data after the DMA/XOR engine notifies the cache manager of the zero data difference. Accordingly a substantial time savings has occurred.

Figure 6:
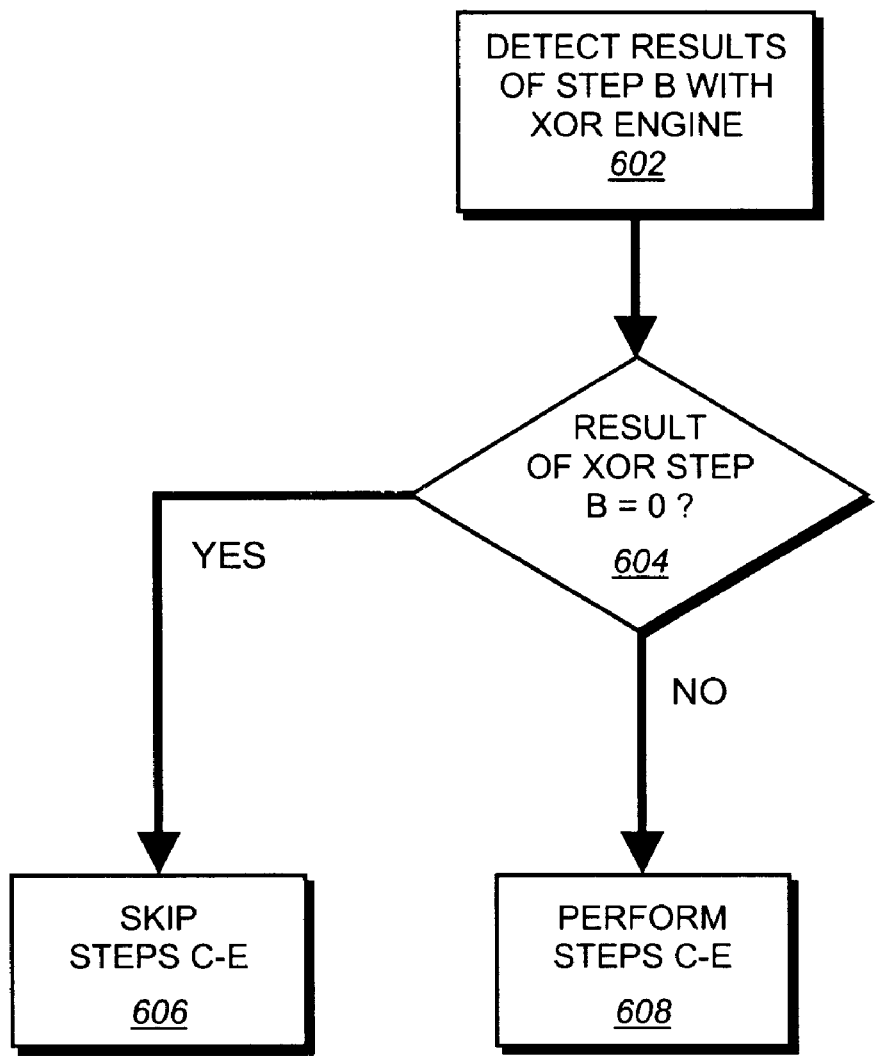
FIG. 6 is a flow diagram of a process for detecting unchanged parity and optimizing random writes based upon such detection.

Conversely, if the result of step B is a non-zero value, then steps C, D, and E are carried out (step 608 in FIG. 6). In other words, the result of step B is XORed with the Old Parity P(0) to derive the data difference (e.g. the new parity P(0)'). Then, the full write of new block 2' and associated new parity P(0)' to the disk array occurs.

The foregoing has been a detailed description of a preferred embodiment of the invention. Various modifications and additions can be made without departing form the spirit and scope of the invention. For example, the DMA/XOR engine can be implemented in a variety of configurations of hardware and firmware. The components falling within the adapter can be varied and components can be variously incorporated into one or more circuit chips or chip sets. Additionally, the principles described herein can be applied to a variety of disk configurations and storage arrangements. Finally, while a data difference result of "zero" is used to indicate no change, while a non-zero result indicates change, it is expressly contemplated that the value zero can be substituted for another known, discrete value or values. Therefore, as used in the context of data difference result herein, the term "zero" shall be taken to include any such indicator of no change, and not simply the number zero. Accordingly, this description is meant to be taken by way of example, and not to otherwise limit the scope of the invention.

What is claimed is:

1. A system for detecting and acting upon unchanged parity in a write operation, wherein an original block of data and associated original parity block are each stored at respective predetermined storage location in a storage disk array and wherein a new block of data is to be written to the respective predetermined storage location, the system comprising:

a cache memory for caching blocks of data and associated parity blocks written from a host processor prior to writing thereof in the disk array and for caching blocks of data and associated parity blocks read from the disk array prior to transfer thereof to the host processor;

a cache manager for controlling caching of the blocks of data and associated parity blocks in the cache memory and transfer of the blocks of data and associated parity blocks to and from the disk array;

a direct memory access and exclusive-OR (DMA/XOR) engine that transfers the blocks of data and associated parity blocks between each of the host processor, cache memory and disk array, the DMA/XOR engine being constructed and arranged to perform an XOR function combining the original block of data read from the disk and cached in the cache memory with the new block of data written from the host and cached in the cache memory to thereby derive a first result and to further perform an XOR function combing the first result with the original parity block to thereby derive a data difference result; and a detector that determines whether the data difference result equals either of a zero or a non-zero value, wherein a predetermined optimization function is performed when the data difference result equals zero.

2. The system as set forth in claim 1 further comprising means for performing the predetermined optimization function including means for maintaining the original block of data and the original parity block in the disk array free of writing the new block of data thereto.

3. The system as set forth in claim 2 wherein the means for performing the predetermined optimization function includes means for discarding the new data block.

4. The system as set forth in claim 3 wherein the DMA/XOR engine is constructed and arranged to perform a write of the new block of data to the respective predetermined storage location in the disk array, thereby replacing the original block of data, and deriving an associated new parity block and writing the associated new parity block to the respective predetermined storage location in the disk array, when the detector detects the data difference equal to the non-zero value.

5. A method for detecting and acting upon unchanged parity in a write operation, wherein an original block of data and associated original parity block are each stored at respective predetermined storage location in a storage disk array and wherein a new block of data is to be written to the respective predetermined storage location, the system comprising:

caching, in a cache memory, blocks of data and associated parity blocks written from a host processor prior to writing thereof in the disk array and caching blocks of data and associated parity blocks read from the disk array prior to transfer thereof to the host processor;

controlling, with a cache manager, caching of the blocks of data and associated parity blocks in the cache memory and transfer of the blocks of data and associated parity blocks to and from the disk array;

transferring, with a direct memory access and exclusive-OR (DMA/XOR) engine, the blocks of data and associated parity blocks between each of the host processor, cache memory and disk array, performing, with the DMA/XOR engine, an XOR function combining the original block of data read from the disk and cached in the cache memory with the new block of data written from the host and cached in the cache memory to thereby derive a first result and to further perform an XOR function combing the first result with the original parity block to thereby derive a data difference result; and detecting whether the data difference result equals either of a zero or a non-zero value, and thereby selectively performing a predetermined optimization function when the data difference result equals zero.

6. The method as set forth in claim 5 wherein the step of performing the predetermined optimization function comprises maintaining the original block of data and the original parity block in the disk array free of writing the new block of data thereto.

7. The method as set forth in claim 6 wherein the step of performing the predetermined optimization function includes discarding the new data block.

8. The method as set forth in claim 7 further comprising performing, with the DMA/XOR engine, a write of the new block of data to the respective predetermined storage location in the disk array, to thereby replace the original block of data, and deriving an associated new parity block and writing the associated new parity block to the respective predetermined storage location in the disk array, when the detector detects the data difference equal to the non-zero value.

9. The method as set forth in claim 8 further comprising, instructing the writing of the new block to a discrete location in the disk array free of sequential writing of data to other adjacent blocks thereto.

* * * * *